United States Patent [19]
Mallow et al.

[11] 3,856,539
[45] Dec. 24, 1974

[54] SOLIDIFIED SILICA FOAM PRODUCT AND PROCESS

[75] Inventors: William A. Mallow; Richard A. Owen; Ethelbert J. Baker, Jr., all of San Antonio, Tex.

[73] Assignee: Southwest Research Institute, San Antonio, Tex.

[22] Filed: Nov. 12, 1971

[21] Appl. No.: 198,279

Related U.S. Application Data
[63] Continuation-in-part of Ser. No. 102,504, Dec. 28, 1970, abandoned.

[30] Foreign Application Priority Data
Dec. 4, 1970   Great Britain ..................... 57615/70

[52] U.S. Cl..................... 106/75, 106/40 R, 106/84
[51] Int. Cl............................................. C04b 35/16
[58] Field of Search....................... 106/75, 84, 40 R

[56] References Cited
UNITED STATES PATENTS

| | | | |
|---|---|---|---|
| 3,095,312 | 6/1963 | Holmes | 106/75 |
| 3,136,645 | 6/1964 | Dess | 106/75 |
| 3,466,221 | 9/1969 | Sams et al | 106/75 |
| 3,661,602 | 5/1972 | Geroin | 106/75 |
| 3,725,095 | 4/1973 | Weidman et al | 106/75 |

Primary Examiner—J. Poer
Attorney, Agent, or Firm—Stevens, Davis, Miller & Mosher

[57] ABSTRACT

An inorganic solidified insulating foam material having a rigid structure comprising silicic acid is made by frothing a mixture of aqueous solution of one or both of two certain alkali metal silicates, a surface tension depressant and a silicon dioxide polymer forming agent with or without the inclusion of an alkali metal silicate gelling agent. The foamed material is permitted to harden free of damaging contraction or expansion under conditions of high humidity, approaching 100% relative humidity.

19 Claims, 1 Drawing Figure

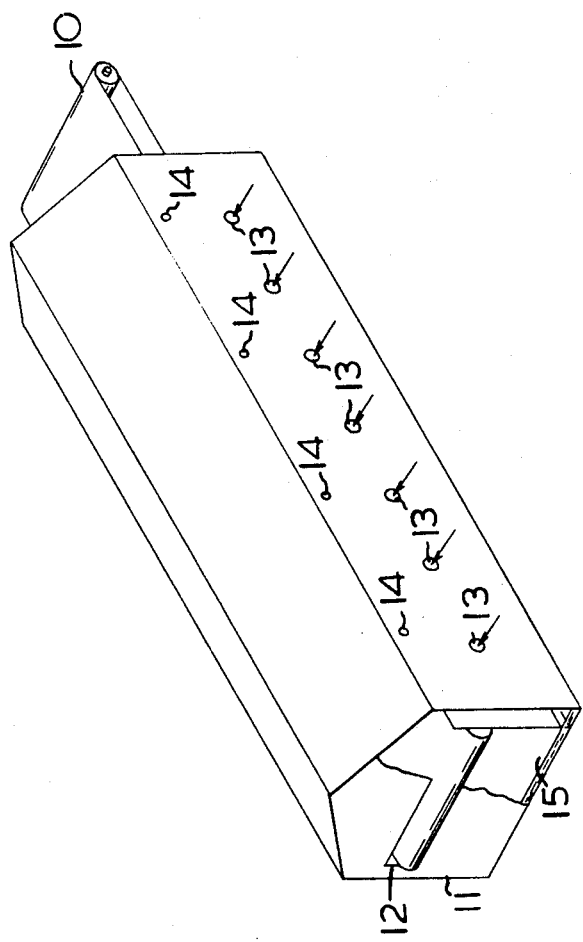

SOLIDIFIED SILICA FOAM PRODUCT AND PROCESS

CROSS-REFERENCES TO RELATED APPLICATIONS

This is a continuation-in-part of application Ser. No. 102,504, Filed Dec. 28, 1970, now abandoned.

BACKGROUND OF THE INVENTION

The field of art to which the invention pertains is the manufacture of a solidified silica foam product from sodium silicate or potassium silicate or mixtures thereof and having a rigid structure comprising silicic acid. An important use of the product is as a structural and insulation material. Its resistance to high temperature and moisture, together with its low thermal conductivity and excellent mechanical strength, makes it especially suited to such use.

In accordance with this invention, it is possible to make such products with or without a filler or reinforcement, and in a preferred form of the invention, there is little or no such filler or reinforcement present. Applicants know of no commercial foamed alkali metal silicate product developed by others that does not contain a filler or reinforcement of some type, such as fibers, to give it strength. With the process and product of the present invention, no fillers or reinforcements in appreciable amounts are required and yet there results a foamed product which at lower densities has greater compressive strength than was previously attainable.

Applicants' product does not require filler and below a dry density of approximately 25 pounds per cubic foot it may have greater compressive strength than comparable filled foams.

The formula for sodium silicate in an aqueous solution is $Na_2O \cdot (SiO_2)_n \cdot xH_2O$ wherein $n$ is any number between 1 and 5 and $x$ is 1 or larger. The formula for potassium silicate in an aqueous solution is $K_2O \cdot (SiO_2)_n \cdot xH_2O$ wherein $n$ is any number between 1 and 5 and $x$ is 1 or larger.

SUMMARY OF THE INVENTION

It is a general object of the present invention to provide a process for making a rigid low density foamed product from an aqueous solution of sodium silicate, potassium silicate or mixtures thereof.

The present invention therefore provides a method for making a foamed alkali metal silicate product including the step of frothing into a foam by gas entrainment a composition comprising an aqueous solution of alkali metal silicate selected from the group consisting of sodium silicate and potassium silicate together with a surface tension depressant, a silicon dioxide polymer forming agent being introduced into the composition in an amount sufficient to make the foam rigid and resistant to degradation by water, shaping the frothed product, and hardening the shaped product in a polymerization zone, the improvement comprising permitting the frothed product to harden free of damaging contraction or expansion, under conditions of high humidity, approaching 100% humidity.

In one particularly advantageous form of the invention, the product will contain only up to about 10% of filler and/or reinforcement material.

The entrained gas will normally be air, although other gasses may be used. The hardening should preferably be effected at a temperature not appreciably different from the temperature at which the foam reaches the polymerizing zone. Such hardening should preferably be effected at a temperature not more than about 10°F. cooler than the temperature at which the foam reaches the polymerizing zone, to minimize damaging contraction. The hardening temperature should preferably be not more than about 5°F. above the temperature at which the foam reaches the polymerizing zone, to avoid damaging expansion unless the foam is physically restrained from expanding.

The polymer forming agent may be added to the composition after the composition is frothed into a foam. Where the frothed product is at an elevated temperature, the polymer forming agent will preferably be added to the foamed product just prior to its arrival in the polymerization zone.

The frothing is preferably effected under superatmospheric pressure with the frothed product being permitted to expand to ambient pressure before hardening by polymerization.

The temperature of a frothed product will preferably be below about 200°F. when it reaches the polymerization zone, and most preferably in the range of about 135° to about 200°F.

The present invention further provides a low density, high strength, shaped foam product prepared from alkali metal silicate, generally having a dry density not greater than about 25 lbs./cu.ft.

It is necessary to use sufficiently high relative humidity to minimize partial or localized dehydration of the foamed mass until the insolubilization reaction and rigidization process are well advanced. The product will be found to be improved through the maintenance of high humidity, especially above 80%. Preferably the relative humidity level is over 90% and most preferably is over 95%.

Other and further objects, features and advantages will be apparent from the following description of the presently preferred examples of the present invention, given for the purpose of disclosure.

The present invention is based upon the discovery that if a polymer (which may if desired, be free of substantial amount of filler), is formed containing chain extensions or crosslinkage or both of silicon dioxide by the reaction of a foamed aqueous solution of sodium silicate, potassium silicate or mixtures thereof with a silicon dioxide polymer forming agent, which agent is mixed with the aqueous solution of silicate either before or after a surface tension depressant has been mixed with the aqueous solution of silicate, and before or after foaming by entrainment of air and if the foam is permitted to harden free of damaging contraction or expansion under conditions of high humidity approaching 100% relative humidity, that a useful improved insulating product having considerable compressive strength is formed (without the necessity of large amounts of filler).

Certain agents may if desired, be added, which under the reaction conditions present will exert a thickening or gelling action of the foam. Such materials may include triacetin, glycol, alcohols, and ketones.

In considering the amount of filler present, we do not include certain forms of silica which are readily soluble in silicate solutions since these materials can be considered to merely raise the ratio of sodium oxide to silicon dioxide in the sodium silicate. For example, this will generally include colloidal silica, including $SiO_2 \cdot n$ $H_2O$, as well as silicic acid $Si(OH)_4$. It will also include certain forms of diatomaceous earth which dissolve readily in silicate. The addition of such materials will not be distinguishable from the initial use of a sodium silicate having a lower sodium oxide: silicon dioxide ratio.

As between sodium silicate and potassium silicate, the preferred alkali metal silicate is sodium silicate. In sodium silicate, the ratio of sodium oxide to silicon dioxide varies from about 1:1 to 1:5; preferably in the range of 1:3 to 1:3.5 both by weight and molecularly. Silicon dioxide is insoluble in water but the sodium oxide and nearly all of its salts, are soluble. Therefore, it is normally desirable to use sodium silicate that has as low a ratio of sodium oxide to silicon dioxide as practicable as this decreases the amount of soluble material in the final product.

Since the sodium silicate used as a raw material is an aqueous solution of sodium silicate, the lower the ratio of sodium oxide to silicon dioxide the less soluble the silicate is in water. The presence of large amounts of water is undesirable. The preferred sodium silicate has 42° Baume with a ratio of sodium oxide to silicon dioxide about 1 to 3.22 at 39 to 42% solids.

The potassium oxide in potassium silicate like the sodium oxide in the sodium silicate is soluble in water. The preferred aqueous potassium silicate solution has a ratio of potassium oxide to silicon dioxide of between 1 to 2.1 and 1 to 2.4 by weight with a total solids content of approximately 38.6%.

The purpose of using surface tension depressants in this invention is the same as in the prior art. It is to reduce the surface tension of the aqueous solution of silicate to facilitate the foaming thereof. Among the surface tension depressants which may be used are soaps, detergents, surface-active agents, and precursors thereof. Palmitic, oleic, stearic, linoleic, naphthenic and lauric soaps and mixtures thereof and various soaps sold under commercial names may be used. Precursors of soap include saponifiable materials such as organic acids and esters of organic acids including naphthenic acids, rosin acid, tall oil acid, corn oil, soybean oil, and tallow acid. Examples of detergents are the alkali metal salts of alkyl sulfonate and of alkaryl sulfonate and various commercial detergents. Surface-active agents include fatty acid esters of isothionate, substituted taurate salt, sodium salts of sulfonated alkaryloxyethers of polyols, fatty acids, alcohol amine condensates, amides, polyoxyethylated fatty alcohols, and alkylaryl polyoxy ether-ols.

Since the surface tension depressants are normally organic materials, only as much surface tension depressant as is necessary to permit a foam to be formed should be added because organic materials are often undesirable in the finished product as many organic materials are combustible, are reactive with other organic materials and may mildew or attract vermin. Normally between about 0.5 and 3 parts by weight of surface tension depressant to 100 parts by weight of the preferred aqueous sodium silicate solution are used. The preferred surface tension depressant is a mixture of tall oil acid and an oleic acid of low linoleic, linolenic or other polyunsaturated acid content.

The silicon dioxide polymer forming agents are chemicals which cause a metathesis of the sodium or potassium silicate and a subsequent or simultaneous cross-linking or chain extension, or both, of silicon dioxide groups. This is believed to form a silicic acid skeleton.

Among the silicon dioxide polymer forming agents may be mentioned sodium, potassium and calcium fluorosilicate; potassium and calcium fluoroborate; calcium fluorotitanate; certain polyvalent metals salts of weak acids; the alkoxy esters and carboxylic acid esters of polyvalent metals such as tetralkyl titanates; dimetallic inorganic salts such as the sodium calcium borates and the lithium calcium borates; magnesium phosphate; zinc oxide; magnesium carbonate; calcium phosphate (dibasic); magnesium phosphate; zinc carbonate; sodium fluoroaluminate; and mixtures of these chemicals.

The term "weak acids" as used herein mean those acids which have a $pk_A$, (logarithm of the dissociation constant) equal to or greater than 1.3, and which favor the formation of stable silicic acid (silicon dioxide polymer) network structures. Examples of such acids are phosphoric acid, iodic acid, hydrofluoric acid, hydrogen tellurite, aluminic acid, boric acid, acetic acid, fumaric acid, maleic acid, malonic acid and succinic acid. Examples of the polyvalent metal salts of such weak acids include magnesium phosphate (tribasic); calcium fluorosilicate; calcium aluminate; calcium tellurite; barium hypophosphate; aluminum acetate (basic); calcium fluoride; calcium orthophosphate; calcium pyrophosphate pentahydrate; copper acetate monohydrate; calcium tungstate (scheelite); cadmium tungstate; borate salts of polyvalent metals such as zinc borate, aluminum borate, calcium borate, cobalt borate and iron borate; calcium fumarate, calcium maleate, calcium malonate and calcium succinate.

The preferred polymer forming agents are sodium fluorosilicate, the calcium and zinc borates, the lithium calcium borates, and the sodium calcium borates, with sodium fluorosilicate, being the most preferred.

All these silicon dioxide polymer forming agents except zinc oxide, magnesium carbonate, calcium phosphate (dibasic), magnesium phosphate, zinc carbonate and sodium fluoroaluminate will normally react at room temperature. The last-named silicon dioxide polymer forming agents are hereinafter sometimes referred to as temperature-activated silicon dioxide polymer forming agents because their polymerization speed is very low at room temperature. These temperature-activated silicon dioxide polymer forming agents are preferably reacted with the aqueous solution of minerals silicates at temperatures between about 135° to 200°F.

While the silicon dioxide polymer forming agents other than those which are temperature-activated will react at room temperatures, their polymerizing reaction kinetics are improved, for example, by reaching a greater speed of reaction without excessive loss in the quality of the polymer formed. The reaction may also go more fully to completion, thus minimizing the residual unreacted sodium silicate in the finished product. Thus, they may preferably also be reacted with the aqueous solution of silicates at temperatures between about 135° and 200°F. By the use of the improved methods of the present invention, it is possible to make commercial use of insolubilizers which would otherwise be unacceptable because of slow speed and poor efficiency of the silicic acid chain formation reaction.

These silicon dioxide polymer forming agents may be mixed with the aqueous solution of alkali metal silicate as powders or in slurries. The amount of polymer forming agent to be added depends upon the degree of polymerization of the final foam and the rate of insolubilization desired. Preferably sodium fluorosilicate is used, preferably in an amount of about 10 to 14 parts by weight of sodium fluorosilicate to 100 parts by weight of the aqueous sodium silicate solution.

The silicon dioxide polymer forming agent may be mixed with the aqueous solution of alkali metal silicate either before or after the surface tension depressant has been mixed with the aqueous solution or before or after the frothing, depending upon the speed at which the particular silicon dioxide polymer forming agent reacts. Normally, the silicon dioxide polymer forming agent will be added after the surface tension depressant has been mixed with the aqueous mineral silicate and after the foaming of that mixture.

The frothing of the silicate mixture to form the foam is achieved by air entrainment which will normally be effected by known methods involving mechanical agitation. In a preferred form, this step is carried out at super atmospheric pressure with the foam then being expanded further by exposure to ambient pressure.

After the foam has been formed, it is allowed to solidify or harden. To avoid the damaging of the foam during the solidification, it should harden at a temperature not more than about 10°F. cooler than the temperature at which the foam is formed. At cooler temperatures, the foam will be damaged by contraction.

If the foam hardens in a mold which is not completely filled or which is not sufficiently pressurized to physically contain the foam and prevent its expansion, then the temperature of the foam during hardening should be maintained no higher than about the temperature at which it was formed, until it has reached a stage of sufficient rigidity or polymerization that the cells can withstand increases in internal pressures caused by higher temperatures. Otherwise structural damage to the foam will be caused as a result of expansion.

The foam should normally be able to tolerate a temperature increase of up to about 5°F. during the rigidization stage, even in the case where the foam is not physically contained during the rigidization. In the case where the foam is physically contained such that it cannot expand during rigidization, much larger temperature increases may be tolerated during the rigidization. An example of such a situation is the case where the material is contained in a mold, such as a pressurized insulated mold, during the rigidization step.

If the mold is completely filled with the foam before it hardens or if the mold has sufficient pressure to prevent expansion, then this upper temperature limit need not be observed. Thus, in a preferred embodiment, the frothing is effected at a lower temperature, without excessive pre-cure in the range of about 135° to 160°F., and the hardening is effected at a higher temperature more than 5° above the temperature at which the foam reaches the hardening and polymerizing zone, said hardening being effected while the foam is physically restricted to prevent thermal expansion.

The purpose of maintaining high humidity approaching 100% relative humidity during hardening is to prevent the escape of moisture from the foam. This can be done in any of several ways. One way is to completely fill a mold with the fluid foamed product so that no moisture can escape from the product while it hardens. Another is to use a mold or container which is not completely filled with the product but in the space that is not filled with the product, a high relative humidity atmosphere is maintained.

Methods of achieving this high humidity may include extrusion of the foam through a continuous heated die initially displacing a forward piston which forces the foam to fill and conform to the die; displacement of a heated liquid from a die or mold; conducting the molded foam through a controlled humidity steam tunnel heated to the desired curing temperature; conveying molds through a liquid bath; enclosing the foam immediately in a plastic bag, or a combination of these.

A typical curing tunnel as shown in FIG. 1 may consist of a conveyor belt system 10, enclosing within a tunnel 11, having an entry opening 12 and an exit opening (not visible). The conveyor belt 10 and any foamed product thereon is blanketed with saturated steam through ports 13 and maintained at the desired curing temperature by temperature monitor means 14. The foamed product may be protected from wall condensation by a canopy (not shown) within the steam tunnel and suspended above the belt 10 and any foam thereon. The entry and exit openings and other aperatures may be protected by flexible curtains, a steam curtain, or any appropriate means of preventing heat and moisture loss. The liquid condensate is removed from tunnel 11 by tunnel drain-off trough means 15.

In the case where wet foam is being laid directly on the belt 10 for in situ shaping and curing, it may be advisable to have vertical side rails co-operating with the belt 10 and moving along with said belt. The rails will shape the edge of the foam product and prevent shear stresses on the liquid foam during the hardening process.

Maintaining such high relative humidity during hardening helps to reduce or prohibit the premature evaporation of water. Any considerable premature evaporation of water contributes to evaporative cooling, film formation of unequal or nonhomogeneously reacted silicates and differential internal and external stresses. The silicon dioxide polymer forming agent is simultaneously retarded in its reaction rate and its solubility is reduced by the premature loss of its water media and resulting temperature depression. The resulting product is thereby weakened and of less than ideal structural continuity and integrity. When the hardening takes place in the presence of high humidity, approaching 100% relative humidity, the loss of liquid from the foam does not take place until the setting of hardening has progressed to a high degree. The drainage which then follows is free of unreacted silicate and silicon dioxide polymer forming agent and contains principally water and soluble reaction products such as fluorides, carbonates, phosphates and hydroxides.

The solidified foam product may contain filler or reinforcement, or it may be formed free of substantial amounts of such filler or reinforcement.

As stated previously herein, this solidified foam product may be formed free of substantial amounts of filler or reinforcement. By "substantial amounts" of filler is meant an amount in excess of about 10% on a dry basis, or about 3% by weight of the alkali metal silicate raw material on a wet basis. The term "filler" as used herein means and includes a material which does not lose its chemical identity in the chemical reaction between the alkali metal silicate and the silicon dioxide polymer forming agent. Examples of such materials are powdered ceramic, burned magnesia, coarse silica and the like. Reinforcements will normally be fibrous materials, such as asbestos fibers, glass fibers, synthetic magnesium silicate fibers, and the like.

Such fillers and reinforcements tend to disrupt the continuous nature of the silicon dioxide polymer that is formed. At solidified foam densities of about 12 pounds per cubic foot and less on a dry basis, it has been found that quite surprisingly the formation of the solidified foam as described herein with the presence of little or no filler gives a product that has greater compressive strength than a product with large amounts of filler. The product which is formed by the present invention is a solid, dimensionally stable foam, having a silicic acid skeleton or structure. It is normally an open-celled microcellular foam.

Depending on the nature of the insolubilizing agent, and the reaction products thereof, and on other factors, the foam may require further treatment before use. For example, in the case of the use of sodium silico fluoride, as the insolubilizer, the foam will contain considerable amounts of sodium fluoride. Sodium fluoride is highly poisonous, and has an undesirably high thermal conductivity, as well as increasing the weight of the foam without significant increase in the strength thereof. For most uses of this foam, it will normally be desirable to remove the fluoride from the foam before use. Also, it may be important to remove residual organic materials, such as by carefully controlled heating.

Following are several examples of the present process and resulting product.

EXAMPLE 1

A foam having a dry density of 3 pounds per cubic foot is obtained by frothing at 165°F. for 2 minutes at 80 to 100 pounds per square inch air pressure in a Binks pot with a stirring speed of 700 r.p.m., a mixture which consists of 60 pounds of 3.22 to 1 ratio sodium silicate of approximately 100 centipoises viscosity at 165°F. (600 centipoise at 74°F.), 0.5 parts tall oil acid of low rosin content (10% or less) per 100 parts of alkali silicate and 0.5 parts of oleic acid of 93% purity per 100 parts of alkali silicate. The foam is then blended with 8.4 pounds of slurried sodium fluorosilicate of fine particle size (90% through 200 mesh sieve) by rapid injection and mixing with a short contact to prevent premature rigidization.

The resulting foamed mixture is then confined in a mold with the mold being completely filled with the mixture so that no moisture can escape. The mixture is maintained in this mold at approximately 180°F. until the foam is completely reacted and rigidized by the polymer forming agent. The foam is cured in 20 to 25 minutes at this temperature and is rigidized within 10 minutes. Gelation occurred within 5 minutes. After curing, the wet foam is dried to any desired degree of residual water content. The rate of drying should be controlled to prevent undue internal stress during water removal. A drying rate of 40 pounds water extraction per 100 pounds of original foam each hour is preferred.

EXAMPLE 2

This is the same as Example 1 except that the alkali metal silicate is a mixed salt composed of sodium and potassium silicates at approximately 3/1 to 20/1 molar ratio of sodium oxide : potassium oxide and a silica/metal oxide ratio between 3 to 1 and 4 to 1 in a 39 to 42% solid solution in water. The temperature during frothing and in the mold was 180°F. When the sodium and potassium silicates are present at approximately 4/1 molar ratio of sodium oxide : potassium oxide, the foam will cure in about 5 minutes, become rigidized in about 2 minutes and gelation will occur in about 1 minute.

EXAMPLE 3

This is the same as Example 2 with the sodium and potassium silicates being present at approximately 4/1 molar ratio of sodium oxide : potassium oxide but with the temperature during the frothing and hardening between 100° and 120°F. Here the foam is cured in 20 to 25 minutes, is rigidized within 10 minutes and gelation occurs within 5 minutes.

EXAMPLE 4

This is a comparison to show the effect of the presence of filler in Applicants' solidified foam product. In each of the tests set forth in Table A below, the fluid foam was made in a Binks pot with 100 parts sodium silicate, 1 to 2 parts fatty acid, 14 parts sodium fluorosilicate at room temperature with or without the addition of glass fibers in the form of ¼ inch chopped fibers. The various densities of the final foam product were controlled by the conditions of frothing, that is, the greater the air pressure and the greater the time involved in frothing, the smaller the density of the final product. The fluid foamed mixture was confined in a mold with the mold being completely filled with the mixture so that no moisture could escape. The mixture was maintained in this mold at room temperature until the foam completely hardened.

In Table A, the listed percentage of glass fiber is percentage of the weight of the dry solidified foam. The densities of 8, 10 and 15 pounds per cubic foot are on a dry basis and the comparative strength listed for those densities are in the pounds per square inch which cause 10% deformation under compression.

TABLE A

| % Glass Fibers | Compressive Strength of 8 lb./cu.ft. Density | Compressive Strength of 10 lb./cu.ft. Density | Compressive Strength of 15 lb.cu.ft. Density |
|---|---|---|---|
| 0 | 45 | 70 | 120 |
| 2.5 | 30 | 55 | 80 |
| 5.0 | 15 | 40 | 80 |
| 5.0 | 15 | 40 | 80 |
| 7.5 | 10 | 30 | 60 |

Tests have also been run making products the same as the 8 and 10 pound per cubic foot density materials of Table A except that these products were allowed to harden while exposed to ambient humidity rather than being confined to 100% relative humidity. The resulting foams has markedly inferior properties. The 8 pound per cubic foot product containing no glass fiber and which hardened while exposed to ambient humidity has a compressive strength of 10 pounds per square inch compared to the 45 pounds per square inch of Table A. Similarly, a 15 pound cubic foot density product containing no glass fiber and which hardened at ambient humidity has a compressive strength of 45 pounds per square inch compared to the 120 pounds per square inch of Table A.

EXAMPLE 5

This is a comparison to show the effect of the presence of certain fillers on the mechanical, chemical and thermal radiation properties of applicants' solidified foam product. A mixture of 100 parts of 3.22 to one ratio sodium silicate (600 cps. at room temperature) with 1 part titanium oxide (rutile) and 1 part synthetic magnesium silicate fiber and 0.5 part carbon black was pumped into an Oakes continuous foaming device (at 700 r.p.m. head speed) and combined with 1.6 parts of tall oil acid. The resulting foam was then blended with 14.6 parts of sodium silicofluoride in a 50% slurry of 3 micron particles. A mechanical in line blender was turned at 1,000 to 1,400 r.p.m. and a homogeneous foam of 8 pcf dry obtained. The foam is generated under 20 PSI pressure and delivered at 4 lbs. per minute. The temperature of the foam so delivered is maintained at 150°F. and 90% relative humidity during production and cure, by passage through a steam tunnel as shown in FIG. 1. The foam so produced was found to have a compressive strength of 40 PSI at less than 10% deformation.

EXAMPLE 6

The conditions and material were similar to Example 5 except that there were 2 parts titanium oxide, 4 parts magnesium silicate fiber, and 1 part of carbon black. The sodium silicofluoride was of 10 micron particle size. The resulting foam had a density of 10 pcf. The foam was generated under 40 PSI pressure and delivered at 8 lbs. per minute. The foam was maintained at approximately 93% relative humidity during the cure. It was found to have a compressive strength of 60 PSI.

EXAMPLES 7 AND 8

This is the same as Examples 5 and 6 with the sodium silicate viscosity increased to 1,000 cps. at 29°C. The rate of frothing was found to be doubled and foams of 8 to 10 pcf were obtained with a shear rate of about one-half less than in Example 5 (400 r.p.m. head speed). With the same shear rate (700 r.p.m.) foams of 5 to 7 pcf resulted.

EXAMPLES 9 AND 10

This is the same as Examples 7 and 8 omitting the fillers. Foams of slightly lower density resulted having about 10% to 20% greater compressive strength.

The foams obtained by incorporation of ball-milled SFS slurry generated at 130° to 150°F. and cured exothermally at these temperatures consist of very uniform microcellular structures of 90 to 98% open cell. The cells of dried foam vary between about 50 and 250 microns in diameter with about 5 to 20 micron cell wall thickness.

From the foregoing discussions, examples and description of the invention, it is apparent that the objects set forth herein as well as others have been achieved. Those skilled in the art will recognize that the principles of this invention may be applied in several ways, only a few of which have been exemplified herein specifically. Accordingly, the invention is to be limited only the the spirit thereon and the scope of the appended claims.

We claim:

1. In a method for making a foamed alkali metal silicate product including the step of frothing into a foam by gas entrainment a composition comprising an aqueous solution of alkali metal silicate selected from the group consisting of sodium silicate and potassium silicate, together with a surface tension depressant, a silicon dioxide polymer forming agent being introduced into the composition in an amount sufficient to make the foam rigid and resistant to degradation by water, shaping the frothed product, and hardening the shaped product in a polymerization zone, the improvement comprising permitting the frothed product to harden free of damaging contraction or expansion, under conditions of high humidity, approaching 100% relative humidity.

2. A method as in claim 1 wherein the frothing is effected under superatmospheric pressure and the frothed product is permitted to expand at atmospheric pressure before hardening by polymerization.

3. A method as in claim 1 wherein the entrained gas is air.

4. A method as in claim 1 wherein the hardening is effected at a temperature not appreciably different from the temperature at which the foam reaches the polymerizing zone.

5. A method as in claim 1 wherein the hardening is effected at a temperature not more than about 10°F. cooler than the temperature at which the foam reaches the polymerizing zone, to avoid damaging contraction.

6. A method as in claim 1 wherein the foam is not physically restricted during hardening and wherein the hardening is effected at a temperature not more than about 5°F. above the temperature at which the foam reaches the polymerizing zone, to avoid damaging thermal expansion.

7. A method as in claim 1, wherein the frothing is effected at a lower temperature, without excessive precure in the range of about 135° to 160°F., and the hardening is effected at a higher temperature more than 5° above the temperature at which the foam reaches the hardening and polymerizing zone, said hardening being effected while the foam is physically restricted to prevent thermal expansion.

8. A method as in claim 1 wherein the polymer forming agent is added to the composition after the composition is frothed into a foam.

9. A method as in claim 1 in which the silicon dioxide polymer agent is selected from the group consisting of sodium fluorosilicate, calcium borate, zinc borate, lithium calcium borates, sodium calcium borates and mixtures thereof.

10. A method as in claim 1 wherein the composition contains not more than about 10% of filler and reinforcement based on the resulting dry product.

11. A method as in claim 1 wherein the temperature of the frothed product is below about 200°F. when it reaches the polymerization zone.

12. A process as in claim 11 wherein the temperature of the frothed product is in the range of about 135° to about 200°F., when it reaches the polymerization zone.

13. A method as in claim 12 wherein the polymer forming agent is added to the foamed product just prior to its arrival in the polymerization zone.

14. A method as in claim 1 wherein the alkali metal silicate is sodium silicate.

15. A method as in claim 14 wherein the sodium silicate has a ratio of sodium oxide to silicon dioxide of 1:1 to 1:5.

16. A method as in claim 14 including not more than about 10% of filler and reinforcement.

17. A method as in claim 1 wherein the silicate composition further comprises an alkali metal silicate gelling agent.

18. A method as in claim 9 wherein the silicon dioxide polymer forming agent is an alkali metal fluorosilicate.

19. A method as in claim 1 wherein the relative humidity is maintained higher than 80% during the hardening step.

* * * * *

UNITED STATES PATENT OFFICE
CERTIFICATE OF CORRECTION

PATENT NO. : 3,856,539
DATED : December 24, 1974
INVENTOR(S) : William A. Mallow, et al It is certified that error appears in the above-identified patent and that said Letters Patent are hereby corrected as shown below:

On the cover sheet, assignee is corrected to read:
Fiberglas Canada Limited
Toronto, Ontario, Canada under Related U.S. Application Data,
"Dec. 28, 1970", is corrected to read:
--Dec. 29, 1970--

Column 1, line 7, "Dec. 28, 1970", is corrected to read:
-- Dec. 29, 1970 --

Signed and Sealed this

Twenty-first Day of September 1976

[SEAL]

Attest:

RUTH C. MASON
Attesting Officer

C. MARSHALL DANN
Commissioner of Patents and Trademarks